(12) United States Patent
Zhang et al.

(10) Patent No.: US 10,048,108 B2
(45) Date of Patent: Aug. 14, 2018

(54) ULTRASONIC FLOW METER HAVING AN ENTRANCE OF A SOUND CHANNEL EQUIPPED WITH A CHAMFER FOR A SMOOTH AND RESTRAINT TURBULENT FLOW

(71) Applicant: Zhejiang Joy Electronic Technology Co., Ltd, Jiaxing (CN)

(72) Inventors: Fengmin Zhang, Jiaxing (CN); Zhongkui Yu, Jiaxing (CN); Yonglong Wang, Jiaxing (CN); Lin Li, Jiaxing (CN)

(73) Assignee: ZHEJIANG JOY ELECTRONIC TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 14/986,772

(22) Filed: Jan. 4, 2016

(65) Prior Publication Data
US 2016/0116317 A1  Apr. 28, 2016

Related U.S. Application Data

(63) Continuation of application No. PCT/CN2013/080189, filed on Jul. 26, 2013.

(30) Foreign Application Priority Data

Jan. 30, 2015  (CN) .................... 2015 2 0064948 U
Jan. 30, 2015  (CN) .................... 2015 2 0064966 U

(51) Int. Cl.
*G01F 1/66* (2006.01)
*G01F 15/18* (2006.01)
*G01F 15/00* (2006.01)

(52) U.S. Cl.
CPC ............ *G01F 15/185* (2013.01); *G01F 1/662* (2013.01); *G01F 1/667* (2013.01); *G01F 15/00* (2013.01)

(58) Field of Classification Search
None
See application file for complete search history.

(56) References Cited

U.S. PATENT DOCUMENTS 5,650,572 A * 7/1997 Vontz ...................... G01F 1/662
                                                                    73/861.27
6,098,466 A * 8/2000 Shkarlet .................... A61B 8/06
                                                                    73/861.25

(Continued)

*Primary Examiner* — Harshad R Patel
(74) *Attorney, Agent, or Firm* — Hemisphere Law, PLLC; Zhigang Ma

(57) ABSTRACT

An ultrasonic flow sensor assembly includes an ultrasonic flow tube, a first reflector, a second reflector, a first ultrasonic transducer, a second ultrasonic transducer, a temperature sensor, and a tube section for accommodating the ultrasonic flow tube. The ultrasonic flow tube includes a water inlet for fixing the first reflector, a water outlet for fixing the temperature sensor and the for fixing the second reflector, a sound channel, a first mounting hole for fixing the first ultrasonic transducer, and a second mounting hole for fixing the second ultrasonic transducer. An entrance of the sound channel is equipped with a chamfer which can make the flow more smoothly and restrain turbulent flow. An installation groove for installing a seal ring is defined at an external sidewall of the ultrasonic flow tube. The ultrasonic flow tube is made of plastic or ceramic.

3 Claims, 8 Drawing Sheets

(56) References Cited

U.S. PATENT DOCUMENTS

| | | | | |
|---|---|---|---|---|
| 9,714,855 B2* | 7/2017 | Bar-On | .................. | G01F 1/667 |
| 2004/0254469 A1* | 12/2004 | Shkarlet | .............. | A61B 5/6876 |
| | | | | 600/459 |
| 2008/0271544 A1* | 11/2008 | Rickli | .................... | G01F 1/662 |
| | | | | 73/861.28 |
| 2009/0178490 A1* | 7/2009 | Konzelmann | .......... | G01F 1/662 |
| | | | | 73/861.29 |
| 2011/0277557 A1* | 11/2011 | Kroemer | ................ | G01F 1/662 |
| | | | | 73/861.18 |
| 2012/0312522 A1* | 12/2012 | Quin | ...................... | G01F 1/662 |
| | | | | 73/861.27 |
| 2013/0205913 A1* | 8/2013 | Sorensen | ............... | G01F 1/667 |
| | | | | 73/861.29 |

* cited by examiner

ULTRASONIC FLOW METER HAVING AN ENTRANCE OF A SOUND CHANNEL EQUIPPED WITH A CHAMFER FOR A SMOOTH AND RESTRAINT TURBULENT FLOW

This is a continuation of PCT application No. PCT/CN2013/080189, filed on Jul. 26, 2013. This application claims the priority of Chinese patent application number 201520064948.3, filed on Jan. 30, 2015 and of Chinese patent application number 201520064966.1, filed on Jan. 30, 2015, the entire contents of which are incorporated herein by reference.

FIELD OF THE DISCLOSURE

The present disclosure relates to flow measurement technologies, and particularly, to an ultrasonic flow tube, an ultrasonic flow tube assembly having the ultrasonic flow tube, an ultrasonic flow sensor having the ultrasonic flow tube assembly, and an ultrasconic flow meter having the ultrasonic flow sensor.

BACKGROUND OF THE DISCLOSURE

With the development of society and the advancement of technology, environment protection and energy saving becomes more important, for example, people put more emphasis on saving daily energy, such as, electricity, water, and fuel gas. Energy measurement plays an important role in energy saving.

Currently, flow meters for measuring flow of fluid, such as water, fuel gas, has experienced periods: mechanical flow meters, half mechanical and half electronic meters, and pure electronic flow meters. Due to abrasion resistance and low pressure loss, ultrasonic flow meters become a popular type flow meter. However, ultrasonic flow meters have some shortcomings, such as low precision and low stabilization. FIGS. 1-2 illustrate an ultrasonic flow meter which is a key component of an ultrasonic flow meter. A pair of ultrasonic transducer is mounted in a metal tube. Ultrasonic from one ultrasonic transducer is reflected by one reflector, and then passes through a sound channel, and is finally reflected toward another ultrasonic transducer by another reflector at opposite end. The ultrasonic flow meter has low precision and low stabilization.

Therefore, it is desired to provide an ultrasonic flow tube, an ultrasonic flow tube assembly having the ultrasonic flow tube, an ultrasonic flow sensor having the ultrasonic flow tube assembly, and an ultrasconic flow meter having the ultrasonic flow sensor.

SUMMARY OF THE DISCLOSURE

To solve the above-mentioned problem and improve the stability of the signal determined by the ultrasonic flow meter. An ultrasonic flow tube is an important component of an ultrasonic flow meter. An initial signal comes from the ultrasonic flow tube. The signals' stability is influenced by the character of the flow in the ultrasonic flow, such as the stability of the flow. The related ultrasonic flow meters have some shortcoming. First, low precision of the metal tube causes a big offset range of the ultrasonic transducer, which can influence the production efficiency and precision. Second, ultrasonic wave is easily disturbed when transfers in the metal tube. Third, the flow in the metal tube has a poor ability to resist disturbance, for example, the flow may have turbulence or eddy.

To solve the above-mentioned problem, the present disclosure provides an ultrasonic flow tube. The ultrasonic flow tube includes a water inlet (1A), a water outlet (1B), a sound channel (2), a first mounting hole (3A) for fixing a first ultrasonic transducer, and a second mounting hole (3B) for fixing a second ultrasonic transducer. The water inlet (1A) defines a first fixing room. The water outlet (1B) defines a second fixing room. An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure of the ultrasonic flow tube. The ultrasonic flow tube is made of plastic or ceramic.

To solve the above-mentioned problem, the present disclosure provides an ultrasonic flow tube assembly. The ultrasonic flow tube assembly includes an ultrasonic flow tube, a first reflector (8A), and a second reflector (8B). The ultrasonic flow tube includes a water inlet (1A), a water outlet (1B), a sound channel (2), a first mounting hole (3A) for fixing a first ultrasonic transducer, and a second mounting hole (3B) for fixing a second ultrasonic transducer. The water inlet (1A) defines a first fixing room. The water outlet (1B) defines a second fixing room. An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure of the ultrasonic flow tube. The first reflector (8A) is located in the first fixing room. The second reflector (8B) is located in the second fixing room. The ultrasonic flow tube is made of plastic or ceramic.

To solve the above-mentioned problem, the present disclosure provides an ultrasonic flow sensor assembly. The ultrasonic flow sensor assembly includes an ultrasonic flow tube, a first reflector (8A), a second reflector (8B), a first ultrasonic transducer, a second ultrasonic transducer, a temperature sensor, and a tube section. The ultrasonic flow tube includes a water inlet (1A), a water outlet (1B), a sound channel (2), a first mounting hole (3A) for fixing the first ultrasonic transducer, and a second mounting hole (3B) for fixing the second ultrasonic transducer. The water inlet (1A) defines a first fixing room for fixing the first reflector (8A). The water outlet (1B) defines a second fixing room for fixing the first reflector (8B) and the water outlet (1B) also defines an installation hole (5) for installing the temperature sensor. An entrance (6A) and an exit (6B) communicating with the water inlet (1A) and the water outlet (1B) respectively are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube. The tube section defines a water inlet (11A) and a water outlet (11B), with the water inlet (11A) and the water outlet (11B) of the tube section communicating and extending through opposite ends thereof, an inner side of tube section defines a flow tube fixing portion (12), a first ultrasonic transducer fixing portion (13A), a second ultrasonic transducer fixing portion (13B) and a temperature sensor fixing portion (15). The ultrasonic flow tube is embedded in the tube section. The water inlet (1A) of the ultrasonic flow tube corresponds to a water inlet (11A) of the tube section. The water outlet (1B) of the ultrasonic flow tube corresponds to a water outlet (11B) of the tube section. The sound channel (2) of the ultrasonic flow tube corresponds to a flow tube fixing portion (12). The first mounting hole (3A) for fixing a first ultrasonic transducer of the ultrasonic flow tube corresponds to a first ultrasonic transducer fixing portion (13A). The second mounting hole (3B) for fixing a second ultrasonic transducer of the ultrasonic flow tube corresponds to a second ultrasonic transducer fixing portion (13B). The first mounting hole (3A) corresponds to a first ultrasonic transducer fixing portion (13A). The second mounting hole (3A) corresponds to a second ultrasonic transducer fixing portion (13B). The installation hole (5) corresponds to a temperature sensor fixing portion (15). The ultrasonic flow tube is made of plastic or ceramic.

To solve the above-mentioned problem, the present disclosure provides an ultrasonic flow meter. The ultrasonic flow meter includes an ultrasonic flow sensor (20) and a controller (18). The ultrasonic flow sensor (20) includes an ultrasonic flow tube, a first reflector (8A), a second reflector (8B), a first ultrasonic transducer, a second ultrasonic transducer, a temperature sensor, and a tube section. The ultrasonic flow tube includes a water inlet (1A), a water outlet (1B), a sound channel (2), a first mounting hole (3A) for fixing the first ultrasonic transducer, and a second mounting hole (3B) for fixing the second ultrasonic transducer. The water inlet (1A) defines a first fixing room. The water outlet (1B) defines a second fixing room. An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure thereof. The ultrasonic flow tube is embedded in the tube section. The water inlet (1A) of the ultrasonic flow tube corresponds to a water inlet (11A) of the tube section. The water outlet (1B) of the ultrasonic flow tube corresponds to a water outlet (11B) of the tube section. The sound channel (2) of the ultrasonic flow tube corresponds to a flow tube fixing portion (12). The first mounting hole (3A) for fixing a first ultrasonic transducer of the ultrasonic flow tube corresponds to a first ultrasonic transducer fixing portion (13A). The second mounting hole (3B) for fixing a second ultrasonic transducer of the ultrasonic flow tube corresponds to a second ultrasonic transducer fixing portion (13B). The first fixing groove (4A) corresponds to a first reflector fixing portion (10A). The second fixing groove (4B) corresponds to a second reflector fixing portion (10B). The installation hole (5) corresponds to a temperature sensor fixing portion (15). The ultrasonic flow tube is made of plastic or ceramic.

The present disclosure solves the above-mentioned problem, and is applied to meters, especially to ultrasonic flow meters. The medium can be selected from a group of water, central heating, or fuel gas. The meters includes ultrasonic water meters, ultrasonic heat energy meters, or ultrasonic gas meters, which can improve the stability and the precision of the meters. Therefore, the ultrasonic flow meters can be widely applied in industrial, commercial, civil, or military occasions.

BRIEF DESCRIPTION OF THE DRAWINGS

In order to illustrate technical schemes of the present disclosure or the prior art more clearly, the following section briefly introduces drawings used to describe the embodiments and prior art. Obviously, the drawing in the following descriptions just is some embodiments of the present disclosure. The ordinary person in the related art can acquire the other drawings according to these drawings without offering creative effort.

DETAILED DESCRIPTION OF ILLUSTRATED EMBODIMENTS

The following sections offer a clear, complete description of the present disclosure in combination with the embodiments and accompanying drawings. Obviously, the embodiments described herein are only a part of, but not all of the embodiments of the present disclosure. In view of the embodiments described herein, any other embodiment obtained by the person skilled in the field without offering creative effort is included in a scope claimed by the present disclosure.

The First Embodiment

Figure 1:
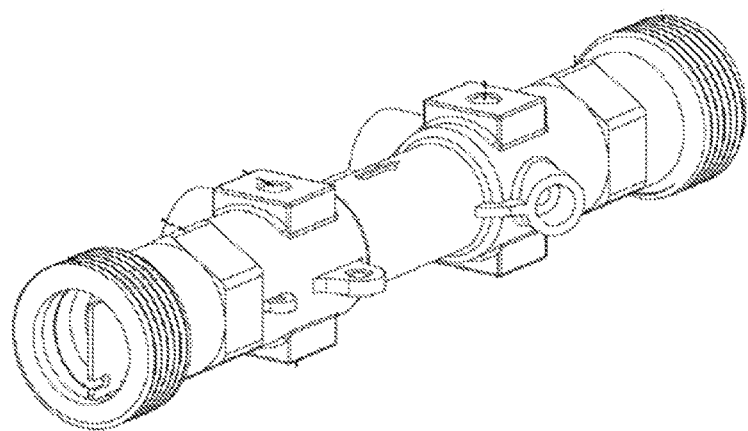
FIG. 1 is an isometric schematic view of a prior art ultrasonic flow sensor.
Figure 2:
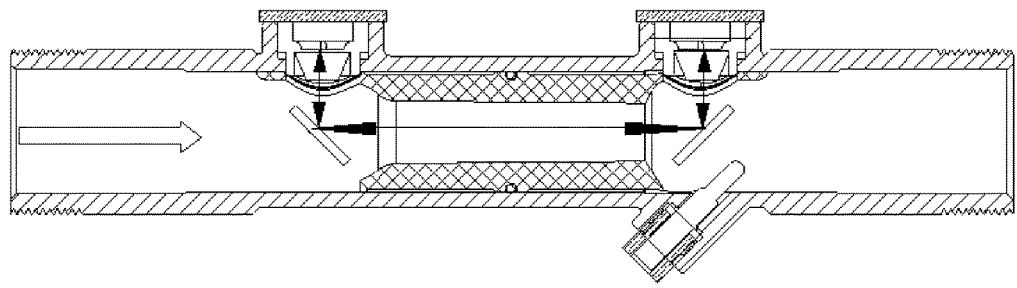
FIG. 2 is a cross section view of the ultrasonic flow sensor of FIG. 1.
Figure 3:
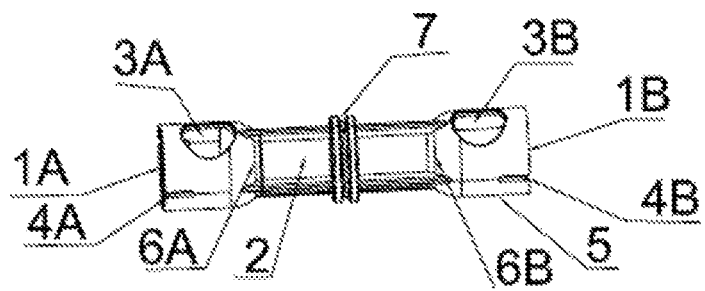
FIG. 3 is an isometric schematic view of an ultrasonic flow tube in accordance with a first embodiment.
Figure 4:
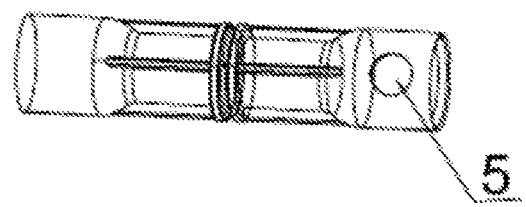
FIG. 4 is similar to FIG. 3, but viewed from another angle.
Figure 5:
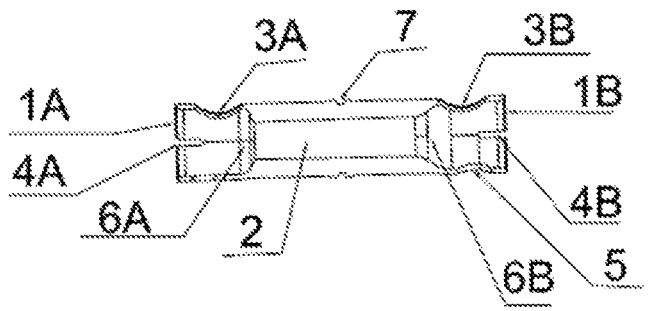
FIG. 5 is a cross section view of the ultrasonic flow tube of FIG. 3.

Referring to FIGS. 3-5, an ultrasonic flow tube includes a water inlet (1A), a water outlet (1B), a sound channel (2), a first mounting hole (3A) for fixing a first ultrasonic transducer, and a second mounting hole (3B) for fixing a second ultrasonic transducer. The water inlet (1A) defines a first fixing room which is a first fixing groove (4A). The first fixing groove (4A) is positioned at a side of the water inlet (1A). The water outlet (1B) defines a second fixing room which is a second fixing groove (4B). The second fixing groove (4B) is positioned at a side of the water outlet (1B). The water outlet (1B) also defines an installation hole (5) for installing a temperature sensor. The installation hole (5) is positioned at a bottom of the water outlet (1B). An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure of the ultrasonic flow tube.

Preferably, the ultrasonic flow tube is made of plastic or ceramic.

The Second Embodiment

Figure 6:
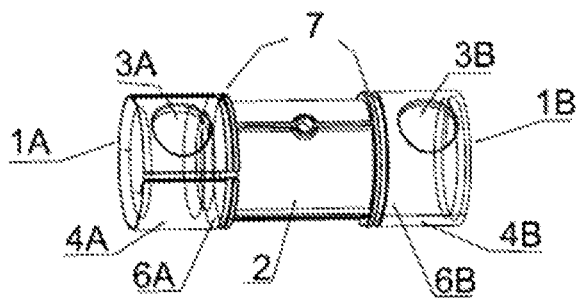
FIG. 6 is an isometric schematic view of an ultrasonic flow tube in accordance with a second embodiment.
Figure 7:
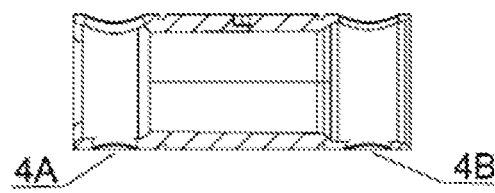
FIG. 7 is a cross section view of the ultrasonic flow tube of FIG. 6.
Figure 8:
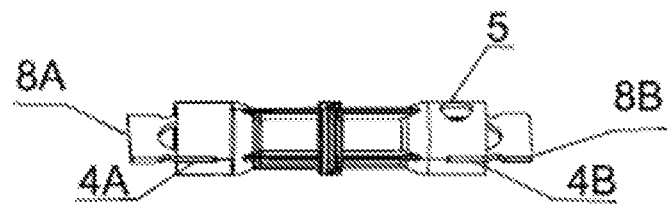
FIG. 8 is an isometric schematic view of an ultrasonic flow tube assembly having a first reflector and a second reflector, in accordance with a third embodiment.
Figure 9:
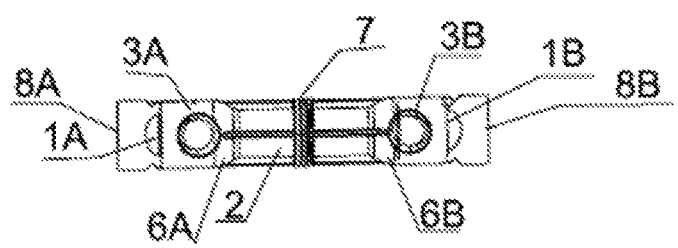
FIG. 9 is similar to FIG. 8, but viewed from another angle.
Figure 10:
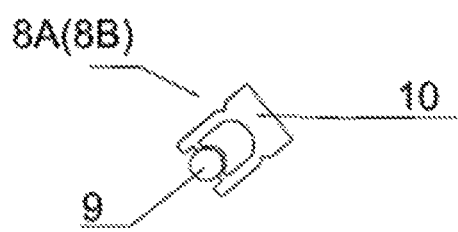
FIG. 10 is a view illustrating the first reflector and the second reflector of FIG. 8.
Figure 11:
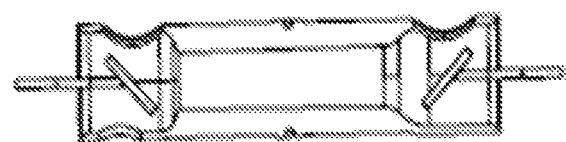
FIG. 11 is a cross section view of the ultrasonic flow tube assembly of FIG. 8.

Referring to FIGS. 6-7, an ultrasonic flow tube includes a water inlet (1A), a water outlet (1B), a sound channel (2), a first mounting hole (3A) for fixing a first ultrasonic transducer, and a second mounting hole (3B) for fixing a second ultrasonic transducer. The water inlet (1A) defines a first fixing room which is a first fixing groove (4A). The first fixing groove (4A) is positioned at a bottom of the water inlet (1A). The water outlet (1B) defines a second fixing room which is a second fixing groove (4B). The second fixing groove (4B) is positioned at a bottom of the water outlet (1B). An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure.

In other embodiments, two installation grooves (7) for installing two seal rings are defined at an external sidewall of the ultrasonic flow tube.

Preferably, the ultrasonic flow tube is made of plastic or ceramic.

The Third Embodiment

Referring to FIGS. 8-11 together with FIGS. 3-5, an ultrasonic flow tube assembly includes an ultrasonic flow tube, a first reflector (8A), and a second reflector (8B). The ultrasonic flow tube includes a water inlet (1A), a water outlet (1B), a sound channel (2), a first mounting hole (3A) for fixing a first ultrasonic transducer, and a second mounting hole (3B) for fixing a second ultrasonic transducer. The water inlet (1A) defines a first fixing room which is a first fixing groove (4A). The first fixing groove (4A) is positioned at a side of the water inlet (1A). The water outlet (1B) defines a second fixing room which is a second fixing groove (4B). The second fixing groove (4B) is positioned at a side of the water outlet (1B). The water outlet (1B) also defines an installation hole (5) for installing a temperature sensor. The installation hole (5) is positioned at a bottom of the water outlet (1B). An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure. The first reflector (8A) is mounted in the first fixing groove (4A). A reflection surface (9) of the first reflector (8A) is a sheet structure and is positioned at a front end of the first reflector (8A). An angle between a center axis of the first mounting hole (3A) and the refection surface (9) of the first reflector (8A) is about 45 degrees. A guide surface (10) of the first reflector (8A) is a sheet structure and is positioned at a rear end of the first reflector (8A). The second reflector (8B) is mounted in the second fixing groove (4B). A reflection surface (9) of the second reflector (8B) is a sheet structure and is positioned at a front end of the second reflector (8B). An angle between a center axis of the second mounting hole (3B) and the refection surface (9) of the second reflector (8B) is about 45 degrees. A guide surface (10) of the second reflector (8B) is a sheet structure and is positioned at a rear end of the second reflector (8B).

Preferably, the ultrasonic flow tube is made of plastic or ceramic.

The Fourth Embodiment

Figure 12:
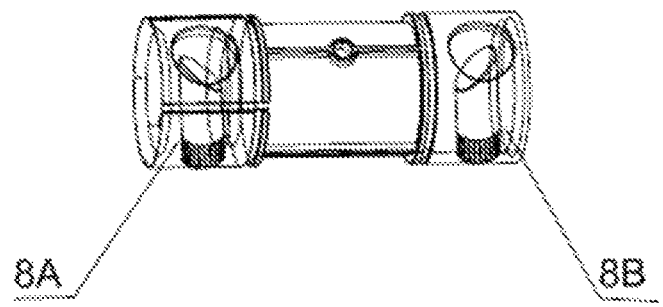
FIG. 12 is an isometric schematic view of an ultrasonic flow tube assembly having a first reflector and a second reflector, in accordance with a fourth embodiment.
Figure 13:
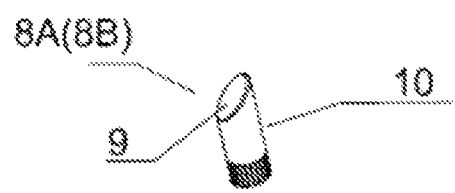
FIG. 13 is a view illustrating the first reflector and the second reflector of FIG. 12.
Figure 14:
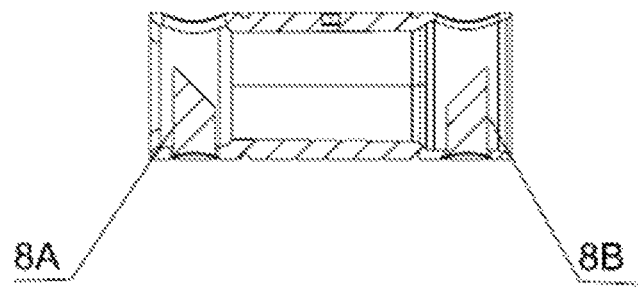
FIG. 14 is a cross section view of the ultrasonic flow tube assembly of FIG. 12.
Figure 15:
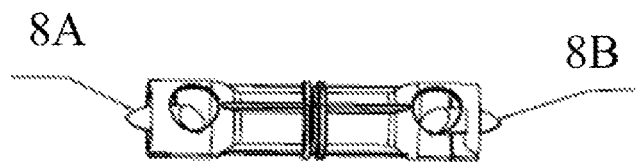
FIG. 15 is an isometric schematic view of an ultrasonic flow tube assembly having a first reflector and a second reflector, in accordance with a fifth embodiment.
Figure 16:
FIG. 16 is similar to FIG. 15, but viewed from another angle.
Figure 17:
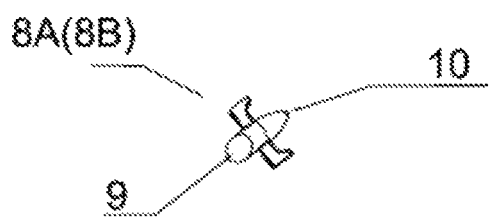
FIG. 17 is a view illustrating the first reflector and the second reflector of FIG. 15.
Figure 18:
FIG. 18 is a cross section view of the ultrasonic flow tube assembly of FIG. 15.

Referring to FIGS. 12-14 together with FIGS. 6-7, an ultrasonic flow tube assembly includes an ultrasonic flow tube, a first reflector (8A), and a second reflector (8B). The ultrasonic flow tube includes a water inlet (1A), a water outlet (1B), a sound channel (2), a first mounting hole (3A) for fixing a first ultrasonic transducer, and a second mounting hole (3B) for fixing a second ultrasonic transducer. The water inlet (1A) defines a first fixing room which is a first fixing groove (4A). The first fixing groove (4A) is positioned at a bottom of the water inlet (1A) aligning with the first mounting hole (3A). The water outlet (1B) defines a second fixing room which is a second fixing groove (4B). The second fixing groove (4B) is positioned at a bottom of the water outlet (1B) aligning with the second mounting hole (3B). An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure. The first reflector (8A) is mounted in the first groove (4A). A reflection surface (9) of the first reflector (8A) is a sloping structure and is positioned at a front end of the first reflector (8A). An angle between a center axis of the first mounting hole (3A) and the refection surface (9) of the first reflector (8A) is about 45 degrees. A guide surface (10) of the first reflector (8A) is a column structure and is positioned at a rear end of the first reflector (8A). The second reflector (8B) is mounted in the second groove (4B). A reflection surface (9) of the second reflector (8B) is a sheet structure and is positioned at a front end of the second reflector (8B). An angle between a center axis of the second mounting hole (3B) and the refection surface (9) of second reflector (8B) is about 45 degrees. A guide surface (10) of the second reflector (8B) is a column structure and is positioned at a rear end of the second reflector (8B).

In other embodiments, two installation grooves (7) for installing two seal rings are defined at an external sidewall of the ultrasonic flow tube.

Preferably, the ultrasonic flow tube is made of plastic or ceramic.

The Fifth Embodiment

Referring to FIGS. 15-18 together with FIGS. 3-5, an ultrasonic flow tube assembly includes an ultrasonic flow tube, a first reflector (8A), and a second reflector (8B). The ultrasonic flow tube includes a water inlet (1A), a water outlet (1B), a sound channel (2), a first mounting hole (3A) for fixing a first ultrasonic transducer, and a second mounting hole (3B) for fixing a second ultrasonic transducer. The water inlet (1A) defines a first fixing room which is a first fixing groove (4A). The first fixing groove (4A) is positioned at a side of the water inlet (1A). The water outlet (1B) defines a second fixing room which is a second fixing groove (4B). The second fixing groove (4B) is positioned at a side of the water outlet (1B). The water outlet (1B) also defines an installation hole (5) for installing a temperature sensor. The installation hole (5) is positioned at a bottom of the water outlet (1B). An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure. The first reflector (8A) is mounted in the first fixing groove (4A). A reflection surface (9) of the first reflector (8A) is a sloping structure and is positioned at front end of the first reflector (8A). An angle between a center axis of the first mounting hole (3A) and the refection surface (9) of the first reflector (8A) is about 45 degrees. A guide surface (10) of the first reflector (8A) is a warhead structure and is positioned at a rear end of the first reflector (8A). The second reflector (8B) is mounted in the second fixing groove (4B). A reflection surface (9) of the second reflector (8B) is a sloping structure and is positioned at a front end of the second reflector (8B). An angle between a center axis of the second mounting hole (3B) and the refection surface (9) of the second reflector (8B) is about 45 degrees. A guide surface (10) of the second reflector (8B) is a warhead structure and is positioned at a rear end of the second reflector (8B).

Preferably, the ultrasonic flow tube is made of plastic or ceramic.

The Sixth Embodiment

Figure 19:
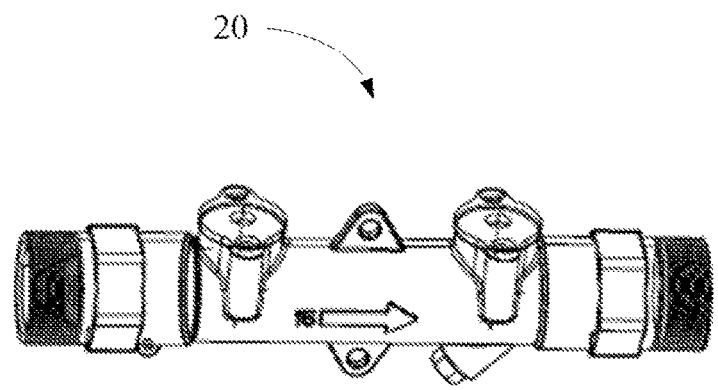
FIG. 19 is an isometric schematic view of an ultrasonic flow sensor in accordance with a sixth embodiment.
Figure 20:
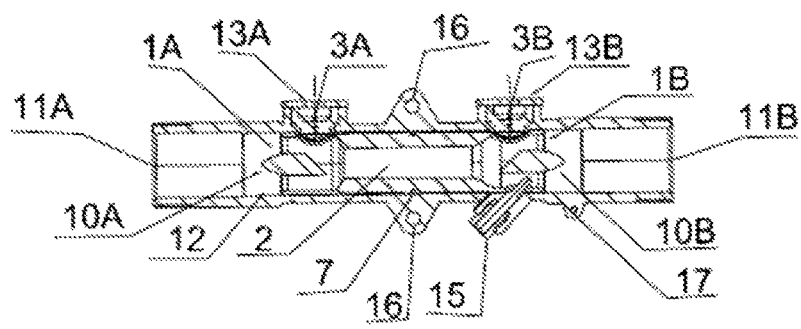
FIG. 20 is a cross section view of the ultrasonic flow sensor of FIG. 19.
Figure 21:
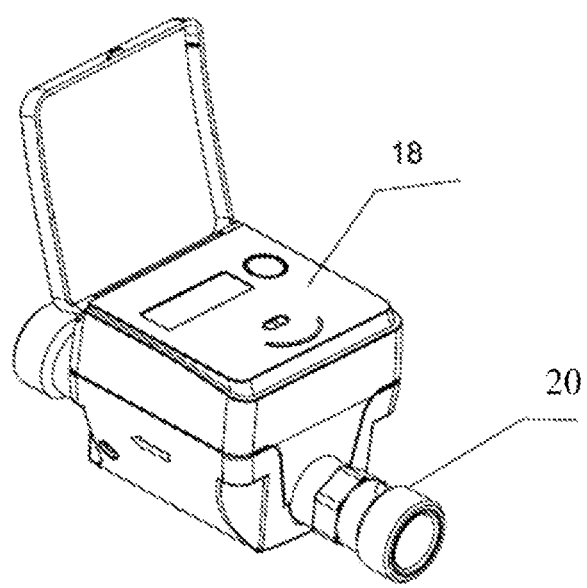
FIG. 21 is an isometric schematic view of an ultrasonic flow meter in accordance with a ninth embodiment.

Referring to FIGS. 19-20 together with FIGS. 3-5, an ultrasonic flow sensor (20) includes an ultrasonic flow tube, a first reflector (8A), a second reflector (8B), two ultrasonic transducers, a temperature sensor, and a tube section. The ultrasonic flow tube includes a water inlet (1A), a water outlet (1B), a sound channel (2), a first mounting hole (3A) for fixing a first ultrasonic transducer, and a second mounting hole (3B) for fixing a second ultrasonic transducer. The water inlet (1A) defines a first fixing room which is a first fixing groove (4A). The first fixing groove (4A) is positioned at a side of the water inlet (1A). The water outlet (1B) defines a second fixing room which is a second fixing groove (4B). The second fixing groove (4B) is positioned at a side of the water outlet (1B). The water outlet (1B) also defines an installation hole (5) for installing the temperature sensor. The installation hole (5) is positioned at a bottom of the water outlet (1B). An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure. The first reflector (8A) is mounted in the first fixing groove (4A). A reflection surface (9) of the first reflector (8A) is a sloping structure and is positioned at a front end of the first reflector (8A). An angle between a center axis of the first mounting hole (3A) and the refection surface (9) of the first reflector (8A) is about 45 degrees. A guide surface (10) of the first reflector (8A) is a warhead structure and is positioned at a rear end of the first reflector (8A). The second reflector (8B) is mounted in the second fixing groove (4B). A reflection surface (9) of the second reflector (8B) is a sloping structure and is positioned at a front end of the second reflector (8B). An angle between a center axis of the second mounting hole (3B) and the refection surface (9) of the second reflector (8B) is about 45 degrees. A guide surface (10) of the second reflector (8B) is a warhead structure and is positioned at a rear end of the second reflector (8B).

The ultrasonic flow tube is embedded in the tube section. The water inlet (1A) of the ultrasonic flow tube corresponds to a water inlet (11A) of the tube section. The water outlet (1B) of the ultrasonic flow tube corresponds to a water outlet (11B) of the tube section. The sound channel (2) of the ultrasonic flow tube corresponds to a tube fixing portion (12) of the tube section. The first mounting hole (3A) for fixing a first ultrasonic transducer of the ultrasonic flow tube corresponds to a first ultrasonic transducer fixing portion (13A) of the tube section. The second mounting hole (3B) for fixing a second ultrasonic transducer of the ultrasonic flow tube corresponds to a second ultrasonic transducer fixing portion (13B) of the tube section. The first fixing groove (4A) for fixing the first reflector (8A) of the ultrasonic flow tube corresponds to a first reflector fixing portion (10A) of the tube section. The second fixing groove (4B) for fixing the second reflector (8B) of the ultrasonic flow tube corresponds to a second reflector fixing portion (10B) of the tube section. The installation hole (5) for installing the temperature sensor of the ultrasonic flow tube corresponds to a temperature sensor fixing portion (15) of the tube section.

Preferably, the tube section also defines first through holes (16) and a second through hole (17).

Preferably, the ultrasonic flow tube is made of plastic or ceramic.

The Seventh Embodiment

The structure of the ultrasonic flow sensor of this embodiment is similar to that of the ultrasonic flow sensor of the sixth embodiment. The difference between the ultrasonic flow sensor of this embodiment and the ultrasonic flow sensor of the sixth embodiment is that: the ultrasonic flow sensor of this embodiment includes the ultrasonic flow tube of the third embodiment.

The Eighth Embodiment

The structure of the ultrasonic flow sensor of this embodiment is similar to that of the ultrasonic flow sensor of the sixth embodiment. The difference between the ultrasonic flow sensor of this embodiment and the ultrasonic flow sensor of the sixth embodiment is that: the ultrasonic flow sensor of this embodiment includes the ultrasonic flow tube of the fourth embodiment.

The Ninth Embodiment

Referring to FIGS. 15-21, an ultrasonic flow meter include an ultrasonic flow sensor (20) and a controller (18). The ultrasonic flow sensor (20) includes an ultrasonic flow tube, a first reflector (8A), a second reflector (8B), two ultrasonic transducers, a temperature sensor, and a tube section. The ultrasonic flow tube includes a water inlet (1A), a water outlet (1B), a sound channel (2), a first mounting hole (3A) for fixing a first ultrasonic transducer, and a second mounting hole (3B) for fixing a second ultrasonic transducer. The water inlet (1A) defines a first fixing room which is a first fixing groove (4A). The first fixing groove (4A) is positioned at a side of the water inlet (1A). The water outlet (1B) defines a second fixing room which is a second fixing groove (4B). The second fixing groove (4B) is positioned at a side of the water outlet (1B). The water outlet (1B) also defines an installation hole (5) for installing the temperature sensor. The installation hole (5) is positioned at a bottom of the water outlet (1B). An entrance (6A) and an exit (6B) are defined at opposite ends of the sound channel (2). The entrance (6A) is equipped with a chamfer which can make the flow more smoothly and restrain turbulent flow. An installation groove (7) for installing a seal ring is defined at an external sidewall of the ultrasonic flow tube. The seal ring is configured to seal the ultrasonic flow tube and a peripheral structure. The first reflector (8A) is mounted in the first fixing groove (4A). A reflection surface (9) of the first reflector (8A) is a sloping structure and is positioned at a front end of the first reflector (8A). An angle between a center axis of the first mounting hole (3A) and the refection surface (9) is about 45 degrees. A guide surface (10) of the first reflector (8A) is a warhead structure and is positioned at a rear end of the first reflector (8A). The second reflector (8B) is mounted in the second fixing groove (4B). A reflection surface (9) of the second reflector (8B) is a sloping structure and is positioned at a front end of the second reflector (8B). An angle between a center axis of the second mounting hole (3B) and the refection surface (9) is about 45 degrees. A guide surface (10) of the second reflector (8B) is a warhead structure and is positioned at a rear end of the second reflector (8B).

The ultrasonic flow tube is embedded in the tube section. The water inlet (1A) of the ultrasonic flow tube corresponds to a water inlet (11A) of the tube section. The water outlet (1B) of the ultrasonic flow tube corresponds to a water outlet (11B) of the tube section. The sound channel (2) of the ultrasonic flow tube corresponds to a flow tube fixing portion (12). The first mounting hole (3A) for fixing a first ultrasonic transducer of the ultrasonic flow tube corresponds to a first ultrasonic transducer fixing portion (13A). The second mounting hole (3B) for fixing a second ultrasonic transducer of the ultrasonic flow tube corresponds to a second ultrasonic transducer fixing portion (13B). The first fixing groove (4A) corresponds to a first reflector fixing portion (10A). The second fixing groove (4B) corresponds to a second reflector fixing portion (10B). The installation hole (5) corresponds to a temperature sensor fixing portion (15). In other words, when the ultrasonic flow tube is embedded in the tube section, the water inlet (1A) of the ultrasonic flow tube is positioned at the water inlet (11A) of the tube section. The water outlet (1B) of the ultrasonic flow tube is positioned at the water outlet (11B) of the tube section. The sound channel (2) of the ultrasonic flow tube is positioned at the flow tube fixing portion (12) of the ultrasonic flow tube. The first mounting hole (3A) for fixing a first ultrasonic transducer of the ultrasonic flow tube is positioned at the first ultrasonic transducer fixing portion (13A) of the tube section. The second mounting hole (3B) for fixing a second ultrasonic transducer of the ultrasonic flow tube is positioned at the second ultrasonic transducer fixing portion (13B) of the tube section. The first fixing groove (4A) of the ultrasonic flow tube is positioned at the first reflector fixing portion (10A) of the tube section. The second fixing groove (4B) of the ultrasonic flow tube is positioned at the second reflector fixing portion (10B) of the tube section. The installation hole (5) of the ultrasonic flow tube is positioned at the temperature sensor fixing portion (15) of the tube section. The ultrasonic flow tube is made of plastic or ceramic.

The controller (18) includes a main board, a liquid crystal, keys, and a housing. The ultrasonic transducers and the temperature sensor are connected to the main board.

Preferably, the tube section also defines a first through hole (16) and a second through hole (17).

Preferably, the ultrasonic flow meter may be a water meter, a heat energy meter, and a gas meter.

What is said above are only preferred examples of present disclosure, not intended to limit the present disclosure, any modifications, equivalent substitutions and improvements etc. made within the spirit and principle of the present disclosure, should be included in the protection range of the present disclosure.

What is claimed is:

1. An ultrasonic flow sensor assembly comprising an ultrasonic flow tube, a first reflector, a second reflector, a first ultrasonic transducer, a second ultrasonic transducer, a temperature sensor, and a tube section, the ultrasonic flow tube comprising a water inlet, a water outlet, a sound channel, a first mounting hole for fixing the first ultrasonic transducer, and a second mounting hole for fixing the second ultrasonic transducer, the water inlet defining a first fixing room for fixing the first reflector, the water outlet defining a second fixing room for fixing the second reflector and the water outlet of the ultrasonic flow tube also defining an installation hole for installing the temperature sensor, an entrance and an exit communicating with the water inlet and the water outlet of the ultrasonic flow tube respectively defined at opposite ends of the sound channel, the entrance equipped with a chamfer which can make the flow more smoothly and restrain turbulent flow, the tube section defining a water inlet and a water outlet, with the water inlet and the water outlet of the tube section communicating and extending through opposite ends thereof, an inner side of tube section defining a flow tube fixing portion, a first ultrasonic transducer fixing portion, a second ultrasonic transducer fixing portion and a temperature sensor fixing portion, the ultrasonic flow tube accommodated in the tube section with the ultrasonic flow tube embedded in the tube section, the water inlet of the ultrasonic flow tube corresponding to a water inlet of the tube section, the water outlet of the ultrasonic flow tube corresponding to a water outlet of the tube section, the sound channel of the ultrasonic flow tube corresponding to a flow tube fixing portion, the first mounting hole for fixing a first ultrasonic transducer of the ultrasonic flow tube corresponding to a first ultrasonic transducer fixing portion, the second mounting hole for fixing a second ultrasonic transducer of the ultrasonic flow tube corresponding to a second ultrasonic transducer fixing portion, the installation hole corresponding to a temperature sensor fixing portion, an installation groove for installing a seal ring defined at an external sidewall of the ultrasonic flow tube, the seal ring configured to seal the ultrasonic flow tube and apertures between the external sidewall of the ultrasonic flow tube and the inner side of the through hole of the tube section, and the ultrasonic flow tube made of plastic or ceramic.

2. The ultrasonic flow sensor of claim 1, wherein the first fixing room is a first fixing groove, the first fixing groove is positioned at a side of the water inlet, the second fixing room is a second fixing groove, and the second fixing groove is positioned at a side of the water outlet.

3. The ultrasonic flow sensor of claim 2, wherein a reflection surface of the first reflector is a sheet structure and is positioned at a front end of the first reflector, an angle between a center axis of the first mounting hole and the refection surface of the first reflector is about 45 degrees, a guide surface of the first reflector is a sheet structure and is positioned at a rear end of the first reflector, a reflection surface of the second reflector is a sheet structure and is positioned at a front end of the second reflector, an angle between a center axis of the second mounting hole and the refection surface of the second reflector is about 45 degrees, and a guide surface of the second reflector is a sheet structure and is positioned at a rear end of the second reflector.

* * * * *